US009569760B2

(12) United States Patent
Deutscher

(10) Patent No.: US 9,569,760 B2
(45) Date of Patent: Feb. 14, 2017

(54) RAPID CHECKOUT AFTER PAYMENT

(75) Inventor: Benjamin Deutscher, Berlin (DE)

(73) Assignee: PAYPAL, INC., San Jose, CA (US)

( * ) Notice: Subject to any disclaimer, the term of this patent is extended or adjusted under 35 U.S.C. 154(b) by 416 days.

(21) Appl. No.: 13/341,540

(22) Filed: Dec. 30, 2011

(65) Prior Publication Data

US 2013/0173426 A1 Jul. 4, 2013

(51) Int. Cl.
*G06Q 30/00* (2012.01)
*G06Q 20/12* (2012.01)

(52) U.S. Cl.
CPC .................. *G06Q 20/127* (2013.01)

(58) Field of Classification Search
CPC ............................... G06Q 30/0613
USPC ............................. 705/24.1, 26.41
See application file for complete search history.

(56) References Cited

U.S. PATENT DOCUMENTS

| | | | | |
|---|---|---|---|---|
| 5,692,132 A * | 11/1997 | Hogan | | 705/26.41 |
| 5,960,411 A * | 9/1999 | Hartman et al. | | 705/26.81 |
| 6,643,624 B2 * | 11/2003 | Philippe | | G06F 17/22 705/26.62 |
| 6,839,690 B1 * | 1/2005 | Foth | | G06Q 20/02 705/26.41 |
| 6,862,612 B1 * | 3/2005 | Horn | | G06Q 30/02 705/26.1 |
| 6,873,968 B2 * | 3/2005 | Ehrlich | | G06Q 20/201 705/20 |
| 6,970,838 B1 * | 11/2005 | Kamath et al. | | 705/26.4 |
| 6,980,962 B1 * | 12/2005 | Arganbright | | G06Q 30/02 705/14.23 |
| 7,127,677 B2 * | 10/2006 | Chou | | H04L 67/02 715/741 |
| 7,156,306 B1 * | 1/2007 | Kenney | | G06Q 20/20 235/454 |
| 7,269,656 B2 * | 9/2007 | Chou | | G06Q 30/06 709/229 |
| 7,315,830 B1 * | 1/2008 | Wirtz | | G06Q 30/0207 345/418 |
| 7,359,871 B1 * | 4/2008 | Paasche | | G06Q 30/02 705/26.8 |
| 7,383,231 B2 * | 6/2008 | Gupta et al. | | 705/66 |
| 7,386,512 B1 * | 6/2008 | Allibhoy | | G06Q 20/027 705/14.49 |
| 7,599,857 B2 * | 10/2009 | Bishop | | G06Q 30/0269 705/14.66 |
| 7,860,757 B2 * | 12/2010 | Cotton | | G06Q 30/06 705/26.42 |
| 7,962,418 B1 * | 6/2011 | Wei | | G06Q 20/12 705/14.17 |
| 8,170,915 B2 * | 5/2012 | Borders | | G06Q 10/0631 705/26.9 |

(Continued)

OTHER PUBLICATIONS

NYNEX and chase unveil prototype interactive payment system; companies join forces to speed development of electronic commerce. (Sep. 21, 1995). Business Wire Retrieved from http://dialog.proquest.com/professional/docview/681619868?accountid=142257.*

*Primary Examiner* — Alexis Casey
(74) *Attorney, Agent, or Firm* — Haynes and Boone, LLP

(57) ABSTRACT

A user's checkout information is stored for a certain amount of time, e.g., 10 minutes, after checkout, and the user is given the option of selecting a button to add one or more items for purchase and completing the purchase by adding the additional item(s) and approving the payment, without having to go through a complete checkout flow again.

15 Claims, 5 Drawing Sheets

(56) References Cited

U.S. PATENT DOCUMENTS

| | | | |
|---|---|---|---|
| 8,266,018 B2* | 9/2012 | Dearlove et al. | 705/27.2 |
| 8,396,810 B1* | 3/2013 | Cook | G06Q 30/06 705/67 |
| 8,793,160 B2* | 7/2014 | Sorem | G06Q 30/02 705/14.53 |
| 2005/0021416 A1* | 1/2005 | Anderson et al. | 705/26 |
| 2006/0015463 A1* | 1/2006 | Gupta | G06Q 20/085 705/52 |
| 2008/0275748 A1* | 11/2008 | John | 705/7 |
| 2008/0275786 A1* | 11/2008 | Gluck | 705/14 |
| 2011/0137748 A1* | 6/2011 | Baher | 705/26.41 |
| 2012/0166268 A1* | 6/2012 | Griffiths | 705/14.23 |

* cited by examiner

RAPID CHECKOUT AFTER PAYMENT

BACKGROUND

Field of the Invention

The present invention generally relates to online shopping, and more particularly, to online shopping checkout and payments.

Related Art

Consumers traditionally shop at brick-and-mortar stores, where consumers travel to the physical stores, shop for items, purchase the items, and take possession of the items, all at the point of sale (POS). However, online shopping is become more and more popular for numerous reasons, including the convenience of shopping from the consumer's home or office and the ability to shop multiple merchants around the world from their computing device, without ever having to leave their house or office.

Payments made through online shopping purchases are typically processed online, either through the consumer submitting information about a funding source, such as a credit card, debit card, or bank account, or using a payment provider, such as PayPal, Inc. of San Jose, Calif. After a consumer is finished shopping, e.g., placing selected items into an online cart or basket, the consumer goes through a payment or checkout flow. As part of the flow, the consumer enters the funding information or payment provider login information, confirms the purchase details and total, and receives a confirmation that the payment was processed.

However, there are times when a consumer may want to add one or more items to the purchase after checkout is completed. In that situation, the consumer typically has to start the shopping and payment process over, e.g., by selecting the item(s) to purchase, adding them to the cart, selecting a shipping address, entering in payment information, and confirming the payment. This can be tedious and inconvenient and possibly leading to the consumer deciding not to make the additional purchase at that time.

Therefore, a need exits for a payment solution that overcomes the disadvantages described above.

SUMMARY

According to one embodiment, a user's checkout information is stored for a certain amount of time, e.g., 10 minutes, after checkout, and the user is given the option of selecting a button to add one or more items for purchase and completing the purchase by adding the additional item(s) and approving the payment, without having to go through a complete checkout flow again. In one embodiment, when the rapid checkout option is no longer available, the button disappears. In another embodiment, after initial checkout, the user sees a timer that counts down the amount of time remaining for the user to select the rapid checkout option or button.

Once selected, the user may be directed to a shopping page, where the user can shop and/or search for additional items for purchase. The user can then select one or more items for purchase. An order page may be displayed to the user showing the previous items along with the new items. The user can then review and confirm the purchase. As a result, the user does not need to go through the full checkout flow again (e.g., login, entering shipping address, billing address, and/or payment information). The additional items may be purchased from the same merchant or from a different merchant/site.

These and other features and advantages of the present invention will be more readily apparent from the detailed description of the embodiments set forth below taken in conjunction with the accompanying drawings.

Figure 1:
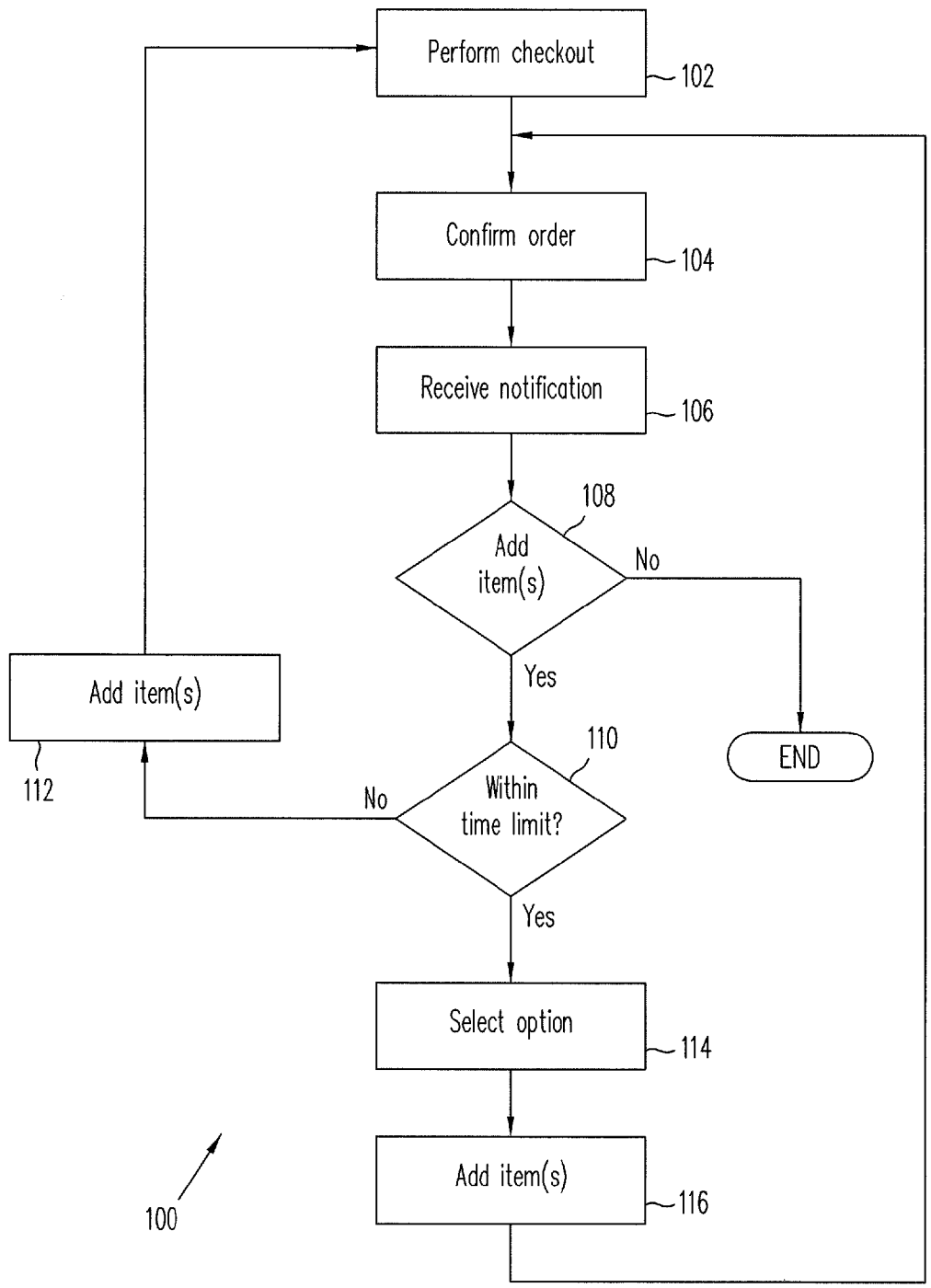
FIG. 1 is a flowchart showing a process a user performs to utilize a rapid checkout function according to one embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

FIG. 1 is a flowchart showing a process 100 a user performs to utilize a rapid checkout function or option according to one embodiment. At step 102, the user goes through a conventional checkout process. For example, the user may access a merchant site, seller site, marketplace site, or other site or mobile app that enables a user to shop and make a purchase. Access may be through a PC, computing tablet, smart phone, or other computing device. The purchase may be items, physical goods, digital goods, donations, services, etc. The user selects desired items for purchase. Note that items, as used herein, may include one or more of the different purchases listed above. The selected items may be placed in a cart, which the user can review and edit if needed. The user continues by entering information for the purchase, such as shipping address, billing address for a credit card, and funding source information. Such information may be pre-populated if it was saved within the site. In that case, the user would simply need to confirm the information or revise if needed. If the information is not saved, the user may need to manually enter the requested information.

If the user is paying with a payment provider, such as PayPal Inc. of San Jose, the user selects an appropriate button or link on the merchant page. The user is then presented with a login screen, either as a new page or a pop-up screen on the same page, requesting login information, such as a user identifier (e.g., user name, email address) and a password or PIN.

Once the requested information has been entered or provided, the user may confirm the order at step 104. Before confirmation, the user may be presented with details of the purchase, such as item description, item prices, total price, shipping costs, tax, etc. If the details are acceptable and correct, the user may select a "Confirm," "Pay," or other button or link to confirm the order.

The payment and/or account information is then processed, such as by a credit card company, a bank, the merchant, a service provider, or a payment provider. If the payment can be approved, a notification is sent to the user and/or the merchant that the payment is approved or completed. A transaction number or identifier may accompany the notification.

At this point, the user may conclude the current purchases with the merchant and await delivery of the purchased items. Alternatively, the user may want to add one or more items to the purchase. This can happen when the user wants to add an item the user forgot to add or did not think about adding during the shopping. Thus, at step 108, the user makes a determination whether to add one or more items to the purchase just completed. If the answer is no, the process ends and the user's funding source is debited, and the purchase is processed, such as the merchant shipping or otherwise delivering the purchased items.

However, if the user wishes to add an item, a determination is made, at step 110, whether the user is within a time limit to add an item and use a rapid checkout option offered by the merchant and/or the payment provider. The user may be given a certain amount of time to use the rapid checkout option. The amount of time may be determined by the merchant, the payment provider, or the user in various embodiments. For example, the payment provider may set the time at 5 minutes. Longer times increase the likelihood that another person may make an authorized purchase from the user device or through the user session with the merchant. Shorter times may not give the user sufficient time to decide that another item should be added. The user may also set a timer period, based on how much risk the user may be willing to take. For example, the user may set a longer time to give the user more time in the event the user wishes to add an item to a just concluded purchase. The user alternatively select a shorter time to minimize exposure, especially if the user expects to make a decision to add an item in a very short time after a purchase is confirmed.

In one embodiment, the user may set different time periods for different merchants or dollar amounts. For example, the user may set a longer period for larger merchants and merchants the user typically makes larger purchases from. Larger merchants have larger inventories, so it may be more likely that the user will want to add an item with a larger merchant than with a smaller specialized merchant or seller. Shorter periods may be set for merchants that the user typically makes single or small purchases from. The payment provider may also set different time periods for different users, such as based on the user's purchase history. For example, if the payment provider sees that the user, in the past, has had to make several transactions with a particular merchant or generally within ten minutes after one transaction has concluded, the payment provider may set the time period for the user at ten minutes generally or for one or more specific merchants. However, for another user, the payment provider may set a time limit of five minutes because the user has many transactions within five minutes of another transaction with the same merchant, but no repeat transactions outside of seven minutes. The merchant may also set time periods if desired or allowed by the payment provider. Note that this option may not be available to all users, depending on the user, the payment provider, and/or the merchant preferences.

If the rapid checkout option is available, the user may be shown a button or link after receiving notification at step 106 that indicates to the user that the rapid checkout option is available. In one embodiment, a timer or clock shows the user time remaining to select the rapid checkout option. Once the timer reaches zero or the option is no longer available, the rapid checkout button may disappear. During the time the rapid checkout option is available, the payment provider and/or the merchant saves the information from the just concluded purchase, such as shipping address, billing address, funding source information, and/or cart or item information. When the rapid checkout option is no longer available, the information is no longer saved.

If the user wishes to add an item after the first purchase and the rapid checkout option is not available, the user may go continue shopping with the merchant and add the item(s) at step 112. This may involve the user selecting a "Continue Shopping" button on the merchant site, which may then present the user a home or shopping page. The user then selects the desired item and performs a conventional checkout at step 102. Thus, the user is required to go through the same or similar checkout process as before because the earlier used information is no longer saved or available for reuse. For example, the user may be asked to login to a payment provider again, enter shipping address, billing address, etc.

However, if the user decides to add an item while the rapid checkout option is available, the user may select the option at step 114, such as by tapping, clicking, or otherwise selecting a button or link on the merchant page, which may be on the same page as the notification received at step 106. Once selected, a communication may be sent to the merchant and/or the payment provider to notify of the user's intent to add one or more items and to use saved information from the earlier transaction to rapidly checkout. In one embodiment, this stops the clock or timer indefinitely. In other words, the user is not limited to when the user needs to complete the transaction to add the additional item(s). In another embodiment, the communication triggers another timer that gives the user a certain amount of time to complete the add-on purchase. Again, the time remaining to complete may be shown to the user, such as in the form of a timer counting down.

The user may then add the additional item(s) at step 116. For example, the user may be redirected back to a shopping page of the merchant, where the user can select the desired item(s) to be placed in the user's shopping cart. Once added to the cart, the user may then confirm the order at step 104. Note that the user no longer needs to perform a checkout again at step 102, e.g., no need to enter shipping information, billing information, login information, and payment information. The user simply needs to confirm the payment and the new item(s) are quickly and easily added to the previously submitted order.

In another embodiment, the newly added item(s) are processed as its own order, i.e., the newly added item(s) are not added to the previous order. However, there are still advantages in that the user does not need to go through a new checkout process to add the new item. The user payment and shipping information are saved so that the user simply has to confirm the new order.

As shown in FIG. 1, after the additional item(s) are added, the user goes through the previously described steps, including step 108, where the user can add more item(s) again. Thus, the user may continue to add items as long as the rapid checkout option is available. For example, the timer may reset each time the user receives a notification at step 106. In other embodiments, the user may be allowed only one or a finite number of uses of the rapid checkout option based on a first full checkout flow. Note that the one or more of the various steps described above may be performed in different order and/or combined as suitable.

Figure 2A:
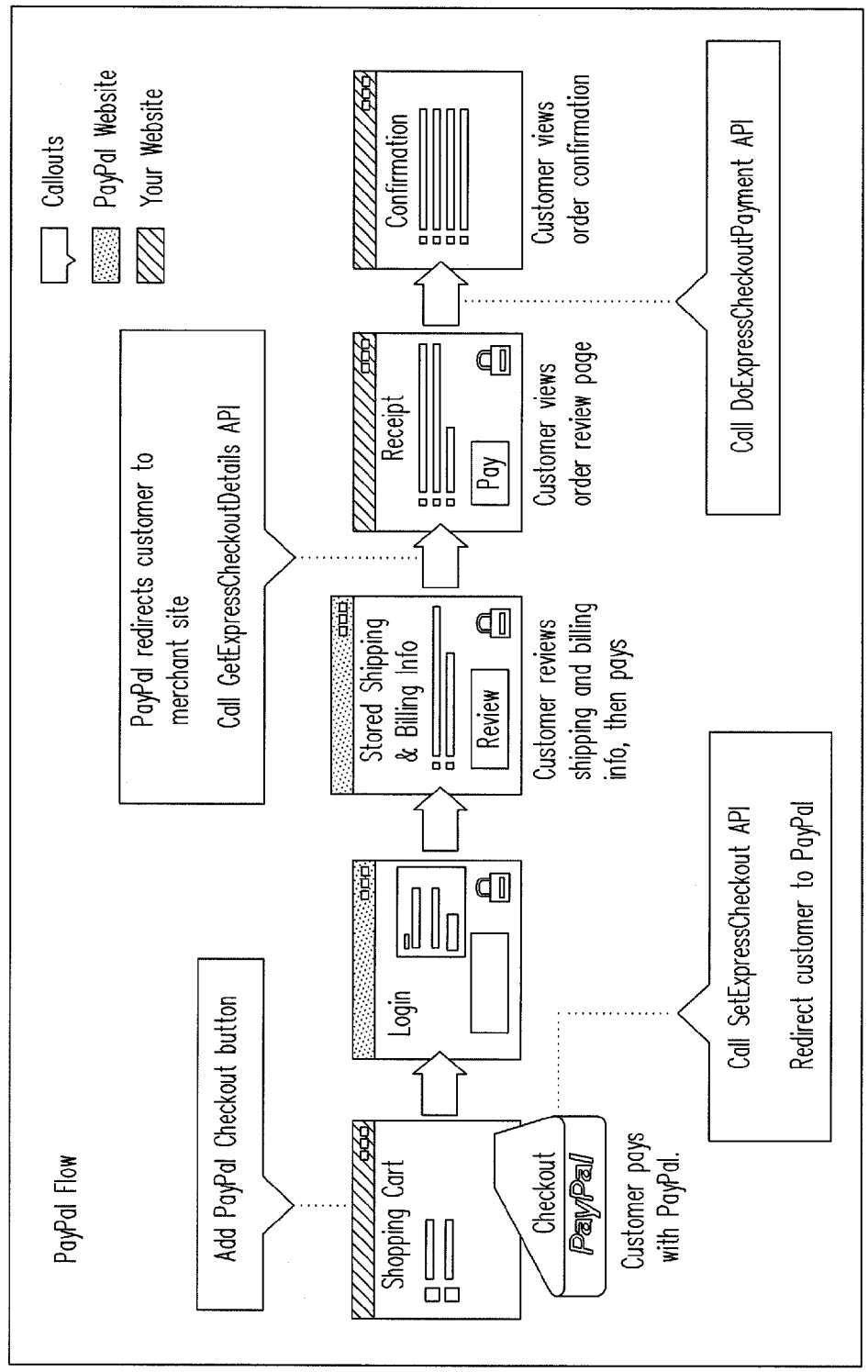
FIGS. 2A and 2B are two exemplary flows illustrating at least a portion of a standard payment flow for a payment provider and a rapid checkout flow for the payment provider, respectively, according to one embodiment.
Figure 2B:
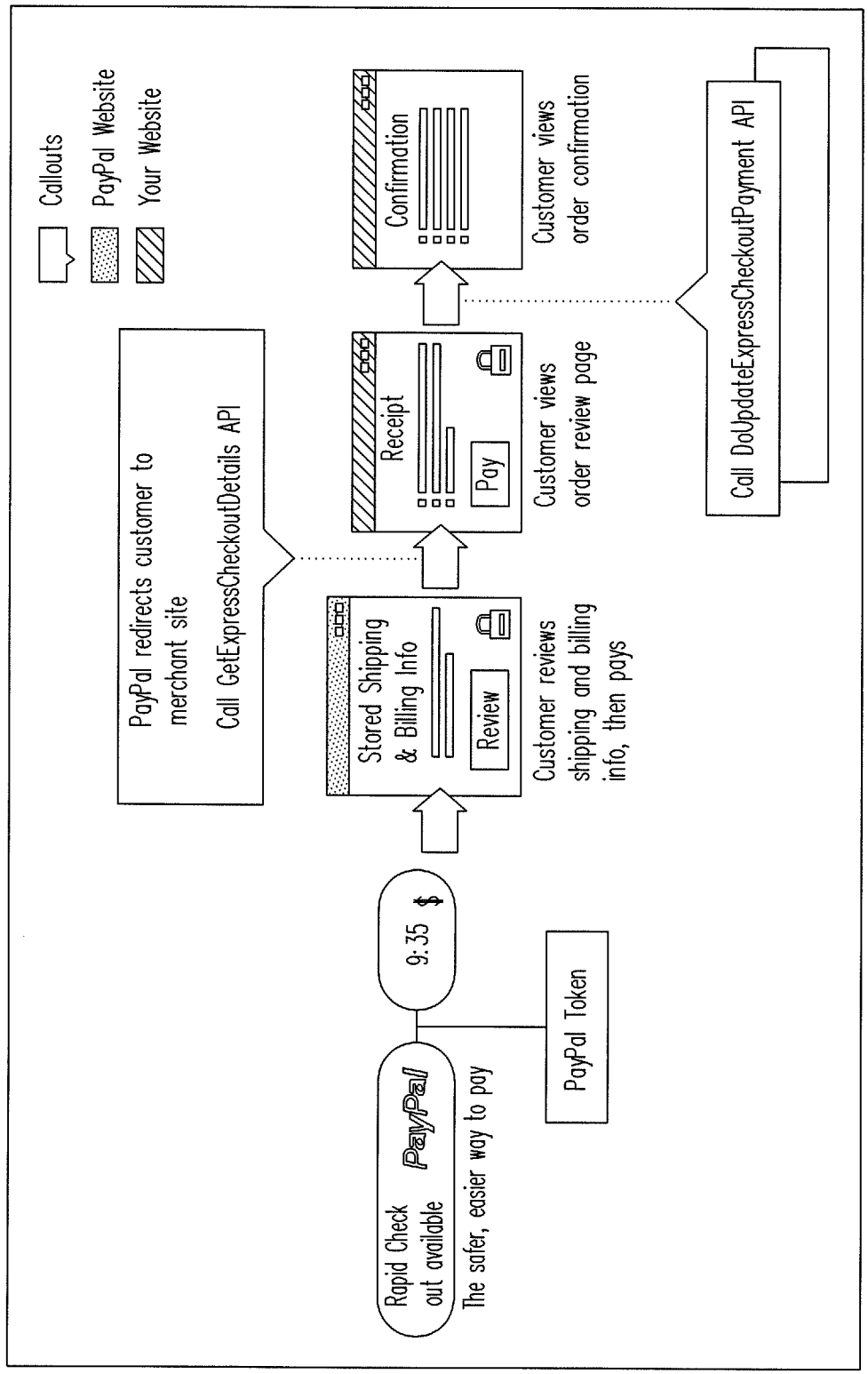

FIGS. 2A and 2B are two exemplary flows illustrating at least a portion of a standard payment flow for a payment provider and a rapid checkout flow for the payment provider, respectively. In FIG. 2A, the merchant has implemented an "Express Checkout" option through the payment provider on the merchant site. Various steps in a payment flow are illustrated, starting with the user ready to pay or checkout after desired items have been placed in a merchant shopping cart and ending with a confirmation that the user sees. When the user wants to add an additional item to the purchase, the user may need to start over again by adding the item and checking out again with the newly added item in a new shopping cart.

However, if the merchant provides the rapid checkout option, such as a button on the confirmation page, the user gets to the review page directly. In the example flow in FIG. 2B, once the user selects the rapid checkout option, the user is directed to the review page, showing information such as shipping information, billing information, etc. If that is confirmed, the user may be redirected to the merchant site to continue shopping, where the user may then add the desired additional item(s) to the cart. In another embodiment, these two steps may be swapped, where the review page will then show the user the previously purchased items and the new item(s). The user does not have to login in again with the payment provider.

For payment, the user may be redirected to the merchant website. As soon as the user selects the "Pay" button, a new payment provider call "DoUpdateExpressCheckoutPayment" is used to update the existing order. To be able to provide the ability to not require user login again to the payment provider website and to match the new and the existing website, the payment provider token that is transferred within the API—merchant communication is used. The token may also be used to define the exact time stamp for the rapid checkout option timer. The time stamp provided by payment provider gives exact information how long the rapid checkout option will be available to the user.

By saving user information for a certain period of time, the user may obtain the benefit of using the rapid checkout option across different merchant sites with the same transaction. For example, the user can visit different websites, add products to the cart and go through the checkout flow without the need to login to the user's account again or enter shipping, billing, or funding information each time. All orders may be added to the same initial transaction if the rapid checkout option (such as calling DoUpdateExpressCheckoutPayment) is used every time the user completes the payment process, assuming the rapid checkout option is still available at each merchant page. For example, the timer or time stamp may reset each time the user finishes adding item(s) to one merchant site.

In one example, after the user finishes payment at merchant A, the user selects the rapid checkout option and may then go to a site of merchant B. The user information is saved by the payment provider. The user places items in the cart at merchant B's site, reviews the cart, and approves payment without having to login with the payment provider. Once a notification is received, the user may again see the rapid checkout option. The user may select the option and then go to a site for merchant C. Again, the user information is saved. The user places desired item(s) in a cart through the merchant C site and proceeds with checkout and payment without having to login with the payment provider. This can continue as long as the user wants to add additional items (either within a current merchant site or a different merchant site) and the rapid checkout option is still available.

In the above example, the user may enter a URL address or select a link from a search to enter a new merchant's site. The user may also select a link on the site of a merchant where the user just completed a transaction. The link may be to one or more products offered by a different merchant.

In one embodiment, the user sees a separate receipt or review page for each separate merchant, although the payment is processed as one transaction by the payment provider. In another embodiment, the user sees a single cumulative receipt or review page, listing items from each separate merchant on the same receipt. The payment provider processes the payment through one user transaction and credits accounts separately to the appropriate merchants.

It is possible to use this functionality to show products of other stores on any website to promote cross-selling between merchants or websites. In one embodiment, when the user has completed the checkout, the user may be shown additional items that may be of interest to the user, such as suggested by the payment provider through the user's current and/or previous purchases. The user can then add those items to the user's just-completed transaction.

Figure 3:
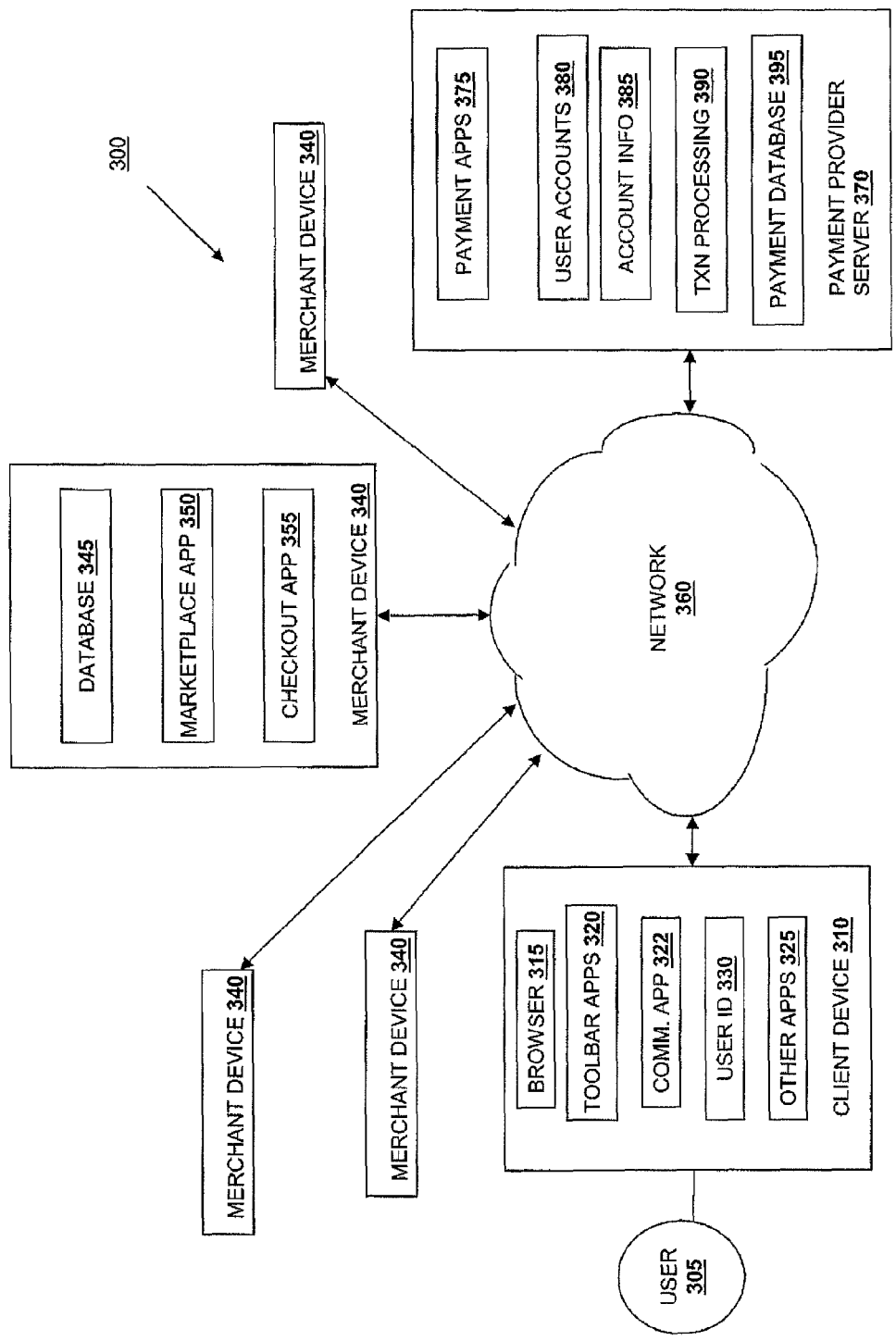
FIG. 3 is block diagram of a networked system suitable for implementing the process described herein according to an embodiment.

FIG. 3 is a block diagram of a networked system 300 configured to handle a transaction using a rapid checkout option, such as described above, in accordance with an embodiment of the invention. System 300 includes a user device 310, a merchant server 340, and a payment provider server 370 in communication over a network 360. Payment provider server 370 may be maintained by a payment provider, such as PayPal, Inc. of San Jose, Calif. A user 305, such as a sender or consumer, utilizes user device 310 to perform transactions using payment provider server 370, such as making multiple purchases from a single completed transaction using the rapid checkout option described above.

User device 310, merchant server 340, and payment provider server 370 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 300, and/or accessible over network 360.

Network 360 may be implemented as a single network or a combination of multiple networks. For example, in various embodiments, network 360 may include the Internet or one or more intranets, landline networks, wireless networks, and/or other appropriate types of networks.

User device 310 may be implemented using any appropriate hardware and software configured for wired and/or wireless communication over network 360. For example, in one embodiment, the user device may be implemented as a smart phone, personal computer (PC), personal digital assistant (PDA), laptop computer, and/or other types of computing devices capable of transmitting and/or receiving data, such as an iPad™ from Apple™. The user may use different user devices to perform different transactions described above.

User device 310 may include one or more browser applications 315 which may be used, for example, to provide a convenient interface to permit user 305 to browse information available over network 360. For example, in one embodiment, browser application 315 may be implemented as a web browser configured to view information available over the Internet. User device 310 may also include one or more toolbar applications 320 which may be used, for example, to provide client-side processing for performing desired tasks in response to operations selected by user 305. In one embodiment, toolbar application 320 may display a user interface in connection with browser application 315 as further described herein.

User device 310 may further include other applications 325 as may be desired in particular embodiments to provide desired features to user device 310. For example, other applications 325 may include security applications for implementing client-side security features, programmatic client applications for interfacing with appropriate application programming interfaces (APIs) over network 360, or other types of applications. Applications 325 may also include email, texting, voice and IM applications that allow user 305 to send and receive emails, calls, and texts through network 360, as well as applications or mobile apps that enable the user to communicate, transfer information, and make payments through the payment provider using a rapid checkout option as discussed above. User device 310 includes one or more user identifiers 330 which may be implemented, for example, as operating system registry entries, cookies associated with browser application 315, identifiers associated with hardware of user device 310, or other appropriate identifiers, such as used for payment/user/device authentication. In one embodiment, user identifier 330 may be used by a payment service provider to associate user 305 with a particular account maintained by the payment provider. A communications application 322, with associated interfaces, enables user device 310 to communicate within system 300.

Merchant server 340 may be maintained, for example, by a merchant or seller offering various products and/or services in exchange for payment to be received over network 360. Merchant server 340 may be used for POS or online purchases and transactions. Generally, merchant server 340 may be maintained by anyone or any entity that receives money, which includes charities as well as retailers and restaurants. Merchant server 340 includes a database 345 identifying available products and/or services (e.g., collectively referred to as items) which may be made available for viewing and purchase by user 305. Accordingly, merchant server 340 also includes a marketplace application 350 which may be configured to serve information over network 360 to browser 315 of user device 310. In one embodiment, user 305 may interact with marketplace application 350 through browser applications over network 360 in order to view various products, food items, or services identified in database 345.

Merchant server 340 also includes a checkout application 355 which may be configured to facilitate the purchase by user 305 of goods or services identified by marketplace application 350. Checkout application 355 may be configured to accept payment information from or on behalf of user 305 through payment service provider server 370 over network 360, such as at a physical POS or online. For example, checkout application 355 may receive and process a payment confirmation from payment service provider server 370, as well as transmit transaction information to the payment provider and receive information from the payment provider (e.g., a transaction ID). Multiple merchant servers 340 may be networked with the payment provider server 370 so that user 305 may use the rapid checkout option across multiple merchants and sites with a single transaction started and completed with one merchant or site.

Payment provider server 370 may be maintained, for example, by an online payment service provider which may provide payment between user 305 and the operator of merchant server 340. In this regard, payment provider server 370 includes one or more payment applications 375 which may be configured to interact with user device 310 and/or merchant server 340 over network 360 to facilitate the purchase of goods or services, communicate/display information, and send payments by user 305 of user device 310 and as discussed above.

Payment provider server 370 also maintains a plurality of user accounts 380, each of which may include account information 385 associated with individual users. For example, account information 385 may include private financial information of users of devices such as account numbers, passwords, device identifiers, user names, phone numbers, credit card information, bank information, or other financial information which may be used to facilitate online transactions by user 305. Advantageously, payment application 375 may be configured to interact with merchant server 340 on behalf of user 305 during a transaction with checkout application 355 to track and manage payment requests and purchases made by users using the rapid checkout option.

A transaction processing application 390, which may be part of payment application 375 or separate, may be configured to receive information from a user device and/or merchant server 340 for processing and storage in a payment database 395. Transaction processing application 390 may include one or more applications to process information from user 305 for processing a payment request and payment by the user selecting the fast checkout option as described herein. As such, transaction processing application 390 may store details of a payment request from a user or merchant. Payment application 375 may be further configured to determine the existence of and to manage accounts for user 305, as well as create new accounts if necessary, such as the set up, management, and use of an account for the user.

Figure 4:
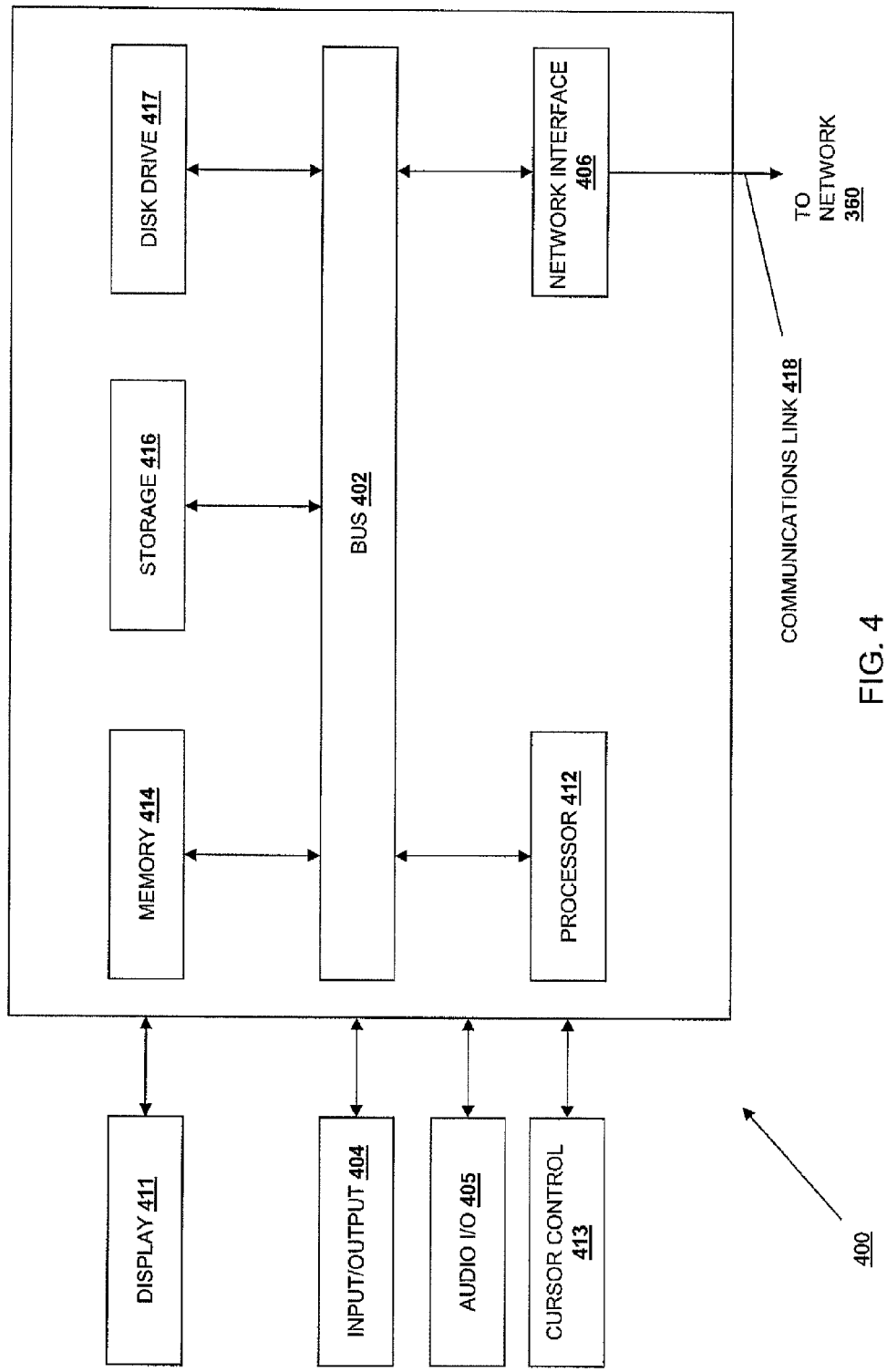
FIG. 4 is a block diagram of a computer system suitable for implementing one or more components in FIG. 3 according to one embodiment.

FIG. 4 is a block diagram of a computer system 400 suitable for implementing one or more embodiments of the present disclosure. In various implementations, the user device may comprise a personal computing device (e.g., smart phone, a computing tablet, a personal computer, laptop, PDA, Bluetooth device, key FOB, badge, etc.) capable of communicating with the network. The merchant and/or payment provider may utilize a network computing device (e.g., a network server) capable of communicating with the network. It should be appreciated that each of the devices utilized by users, merchants, and payment providers may be implemented as computer system 400 in a manner as follows.

Computer system 400 includes a bus 402 or other communication mechanism for communicating information data, signals, and information between various components of computer system 400. Components include an input/output (I/O) component 404 that processes a user action, such as selecting keys from a keypad/keyboard, selecting one or more buttons or links, etc., and sends a corresponding signal to bus 402. I/O component 404 may also include an output component, such as a display 411 and a cursor control 413 (such as a keyboard, keypad, mouse, etc.). An optional audio input/output component 405 may also be included to allow a user to use voice for inputting information by converting audio signals. Audio I/O component 405 may allow the user to hear audio. A transceiver or network interface 406 transmits and receives signals between computer system 400 and other devices, such as another user device, a merchant server, or a payment provider server via network 360. In one embodiment, the transmission is wireless, although other transmission mediums and methods may also be suitable. A processor 412, which can be a microcontroller, digital signal processor (DSP), or other processing component, processes these various signals, such as for display on computer system 400 or transmission to other devices via a communication link 418. Processor 412 may also control transmission of information, such as cookies or IP addresses, to other devices.

Components of computer system 400 also include a system memory component 414 (e.g., RAM), a static storage component 416 (e.g., ROM), and/or a disk drive 417. Computer system 400 performs specific operations by processor 412 and other components by executing one or more sequences of instructions contained in system memory component 414. Logic may be encoded in a computer readable medium, which may refer to any medium that participates in providing instructions to processor 412 for execution. Such a medium may take many forms, including but not limited to, non-volatile media, volatile media, and transmission media. In various implementations, non-volatile media includes optical or magnetic disks, volatile media includes dynamic memory, such as system memory component 414, and transmission media includes coaxial cables, copper wire, and fiber optics, including wires that comprise bus 402. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 400. In various other embodiments of the present disclosure, a plurality of computer systems 400 coupled by communication link 418 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A payment provider server comprising:
   a non-transitory memory storing information about an account of a user with a payment provider; and
   one or more hardware processors coupled to the non-transitory memory and configured to read instructions to cause the server to perform operations comprising:
      in response to the user interacting with a merchant website displayed on a user device and selecting a checkout option, receiving a first payment request from the merchant website;
      in response to the receiving of the first payment request, transmitting a token associated with the first payment request to the merchant website;
      receiving login information to the account of the user with the payment provider and checkout information indicating shipping and billing information to be used for the first payment request;
      processing a first payment corresponding to the first payment request from the account of the user with the payment provider to an account of a merchant associated with the merchant website;
      storing the checkout information indicating the shipping and billing information received for the first payment request with a specific time limit after the processing of the first payment corresponding to the first payment request;
      in response to a subsequent interaction at the merchant website by the user device, presenting, based on the stored checkout information and the subsequent interaction being within the specific time limit, a rapid checkout option on the merchant website displayed on the user device, wherein the rapid checkout option would not be presented based on the stored checkout information for interactions that are not within the specific time limit;
      providing on the merchant website displayed on the user device a timer that indicates a length of time remaining for the rapid checkout option to be available;
      monitoring for a second payment request comprising the token during the specific time limit;
      in response to the user interacting with the merchant website displayed on the user device and selecting the rapid checkout option, receiving the second payment request comprising the token based on the monitoring; and
      processing a second payment corresponding to the second payment request from the account of the user with the payment provider to the account of the merchant associated with the merchant website using the stored checkout information without the need for the user to provide the login information to the account of the user with the payment provider.

2. The server of claim 1, wherein the token is used for the processing of the second payment corresponding to the second payment request.

3. The server of claim 1, wherein the processing of the second payment corresponding to the second payment request is performed without requiring entry by the user of shipping address, billing address, or funding source information.

4. The server of claim 1, wherein the timer resets each time the user selects the rapid checkout option.

5. A method comprising:
  in response to a user interacting with a merchant website displayed on a user device and selecting a checkout option, receiving, by a processor of a payment provider server associated with a payment provider, a first payment request from the merchant website;
  in response to the receiving of the first payment request, transmitting, by the processor, a token associated with the first payment request to the merchant website;
  receiving, electronically by the processor, login information to an account of the user with the payment provider and checkout information indicating shipping and billing information to be used for the first payment request;
  processing, by the processor, a first payment corresponding to the first payment request from the account of the user with the payment provider to an account of a merchant associated with the merchant website;
  storing, by the processor, the checkout information indicating the shipping and billing information received for the first payment request with a specific time limit after the processing of the first payment corresponding to the first payment request;
  in response to a subsequent interaction at the merchant website by the user device, presenting, based on the stored checkout information and the subsequent interaction being within the specific time limit, a rapid checkout option on the merchant website displayed on the user device, wherein the rapid checkout option would not be presented based on the stored checkout information for interactions that are not within the specific time limit;
  providing on the merchant website displayed on the user device a timer that indicates a length of time remaining for the rapid checkout option to be available;
  monitoring, by the processor, for a second payment request comprising the token during the specific time limit;
  in response to the user interacting with the merchant website displayed on the user device and selecting the rapid checkout option, receiving, by the processor, the second payment request comprising the token based on the monitoring; and
  processing a second payment corresponding to the second payment request from the account of the user with the payment provider to the account of the merchant associated with the merchant website using the stored checkout information without the need for the user to provide the login information to the account of the user with the payment provider.

6. The method of claim 5, wherein the token is used for the processing of the second payment corresponding to the second payment request.

7. The method of claim 5, wherein the processing of the second payment corresponding to the second payment request requires no entry by the user of shipping address, billing address, or funding source information.

8. The method of claim 5, wherein the timer resets each time the user selects the rapid checkout option.

9. A non-transitory machine-readable medium having stored thereon machine-readable instructions executable to cause a payment provider server associated with a payment provider to perform operations comprising:
  in response to a user interacting with merchant website displayed on a user device and selecting a checkout option, receiving a first payment request from the merchant website;
  in response to the receiving of the first payment request, transmitting a token associated with the first payment request to the merchant website;
  receiving login information to an account of the user with the payment provider and checkout information indicating shipping and billing information to be used for the first payment request;
  processing a first payment corresponding to the first payment request from the account of the user with the payment provider to an account of a merchant associated with the merchant website;
  storing the checkout information indicating the shipping and billing information received for the first payment request with a specific time limit after the processing of the first payment corresponding to the first payment request;
  in response to a subsequent interaction at the merchant website by the user device, presenting, based on the stored checkout information and the subsequent interaction being within the specific time limit, a rapid checkout option on the merchant website displayed on the user device, wherein the rapid checkout option would not be presented based on the stored checkout information for interactions that are not within the specific time limit;
  providing on the merchant website displayed on the user device a timer that indicates a length of time remaining for the rapid checkout option to be available;
  monitoring for a second payment request comprising the token during the specific time limit;
  in response to the user interacting with the merchant website displayed on the user device and selecting the rapid checkout option, receiving the second payment request comprising the token based on the monitoring; and
  processing a second payment corresponding to the second payment request from the account of the user with the payment provider to the account of the merchant associated with the merchant website using the stored checkout information without the need for the user to provide the login information to the account of the user with the payment provider.

10. The non-transitory machine-readable medium of claim 9, wherein the token is used for the processing of the second payment corresponding to the second payment request.

11. The non-transitory machine-readable medium of claim 9, wherein the processing of the second payment corresponding to the second payment request requires no entry by the user of shipping address, billing address, or funding source information.

12. The non-transitory machine-readable medium of claim 9, wherein the timer resets each time the user selects the rapid checkout option.

13. The server of claim 1, wherein the operations further comprise determining the specific time limit based on the merchant website, a dollar amount for the second payment request, and/or a purchase history of the user.

14. The method of claim 5, further comprising determining the specific time limit based on the merchant website, a dollar amount for the second payment request, and/or a purchase history of the user.

15. The non-transitory machine-readable medium of claim 9, wherein the operations further comprise determining the specific time limit based on the merchant website, a dollar amount for the second payment request, and/or a purchase history of the user.

* * * * *